Patented Nov. 20, 1951

2,575,323

UNITED STATES PATENT OFFICE 2,575,323

MANUFACTURE OF ORGANOLEAD COMPOUNDS

Hymin Shapiro, Detroit, and Earl G. De Witt, Ferndale, Mich., assignors to Ethyl Corporation, New York, N. Y., a corporation of Delaware No Drawing. Application December 9, 1950, Serial No. 200,124

3 Claims. (Cl. 260—437)

This invention relates to a new process for making alkyllead and aryllead compounds.

The most important of the organolead compounds is tetraethyllead which is made commercially by reacting monosodium lead alloy with ethyl chloride in accordance with the following equation:

$$4NaPb + 4C_2H_5Cl \rightarrow (C_2H_5)_4Pb + 4NaCl + 3Pb \quad (I)$$

This process has been successful but it has certain disadvantages among which are the necessity of forming a sodium-lead alloy and the inherent limitations in yield since three-fourths of the lead is not utilized in the reaction. The unused lead must be recovered and re-alloyed with the sodium.

A principal object of my invention is to provide a process using free lead, thereby avoiding the expensive alloying operation.

The above and other objects are accomplished by reacting lead with an alkylating agent in the presence of an addition compound of an alkali metal and a polycyclic aromatic hydrocarbon. My reaction can be generalized by the following equation:

$$Pb + 4RX + 2R'M_2R' \rightarrow R_4Pb + 4MX + 4R' \quad (II)$$

where R is an alkyl or aryl radical, R' is a polycyclic aromatic radical, M is an alkali metal and X is an inorganic acid radical which forms a salt with the alkali metal.

It should be noted that the theoretical yield of the alkyllead compound based on the lead is four times that of the present commercial process. Also the polycyclic aromatic hydrocarbon is readily recovered and can be reused in making the addition compound with the alkali metal. The method of making the alkali-metal polycyclic-aromatic complex is well-known and fully described in United States Patents No. 2,150,039; 2,146,447; 2,125,401; 2,023,793; and 2,019,832. Such polycyclic aromatic complexes can be first prepared and then used in my process, or they can be prepared in situ by adding sodium, a polycyclic aromatic and a solvent, such as those described in the above-mentioned patents, for example, 1,2-dimethoxyethane, to the free lead and the alkylating agent. Any of the alkali metals can be used, although sodium, potassium and lithium are preferred. Among the polycyclic aromatics which can be used in making the alkali metal-aromatic complexes are naphthalene, diphenyl, phenanthrene, and anthracene.

Any of the alkylating agents heretofore used or described in the prior art can be used, among which are the alkyl and aryl halides preferably the iodides, bromides and chlorides, the dialkyl sulfates and the trialkyl phosphates. In general, the alkylating and arylating agents are esters of inorganic acids having the proper alkyl or aryl groups for making the desired organolead compound, and having an inorganic acid group which forms a salt with the alkali metal. Among those which can be used in my invention are the ethyl, propyl, butyl and phenyl chlorides, as well as the corresponding bromides and iodides, as well as diethylsulfate and triethylphosphate.

While tetraethyllead is the principal compound discussed herein because of its large commercial use, other alkyllead compounds such as tetramethyllead, tetrapropyllead, dimethyldiethyllead, methyltriethyllead, tetraphenyllead, diethyldiphenyllead can be made by the process of my invention.

The temperature employed is not critical, the preferable range being between 50° and 100° C. The pressure used is not critical but should be sufficient at the temperature employed to maintain the alkylating agent in the liquid phase. The time of reaction is between about 30 minutes and 5 hours. The amount of alkylating agent employed is not critical but an excess over the stoichiometric amount required in the above general equation is preferred. For highest yields a slight stoichiometric excess of the alkali metal aromatic complex should be used although lesser amounts give proportionate yields and will result in an increase in yield when used concurrently with the present process.

Our process can be used concurrently to improve the yield of the present commercial process or it can be used independently in treating the unreacted lead from the present process or other forms of free lead. By concurrently is meant either adding the alkali metal complex along with the other reactants to the present process or first conducting the reaction of the present process and then adding the alkali metal complex. Such an overall reaction is expressed by the following illustrative equation:

$$2NaPb + 8RX + 3R'Na_2R' \rightarrow 2R_4Pb + 8NaX + 6R' \quad (III)$$

Also in place of sodium other metals, generally the alkali earth and alkali metals, well-known for this purpose, can be alloyed with the lead and used in the above reaction. Among such metals are potassium and calcium.

While catalysts are not essential to our invention, certain amines, particularly aromatic amines such as dimethylaniline, ethylaniline, diphenylamine, phenylenediamines and methylethylaniline, improve the yields obtained in our process.

Our invention can be best understood by referring to the following working examples, wherein small quantities of the metal-polycyclic aromatic complexes are used. If larger amounts are used even better yields are obtained although the results shown herein are satisfactory for a continuous operation.

Example I

A charge of 100 parts of NaPb alloy is added to a reaction vessel, equipped with an agitator, a jacket for circulation of heating or cooling liquids, a reflux condenser, charging and discharging ports, liquid feed lines, and means for releasing the pressure. Liquid ethyl chloride in the amount of 111 parts is added under pressure to the stirred solids in the vessel over a period of one-half hour. By controlling the flow of liquid in the autoclave jacket and in the reflux condenser the temperature of the reaction mass is permitted to rise from an initial temperature of 50° C. to a temperature of 70° C. during this feed period. The pressure in the autoclave during this feed rises to 75 pounds per square inch gauge, where it is maintained. The temperature of the stirred reaction mixture is maintained at 70° C. for an additional 15 minutes maintaining the 75-pound pressure. At the end of this period an additional 53 parts of ethyl chloride was charged to the reaction vessel along with a solution comprising 35.9 parts of sodium-naphthalene complex, 83 parts of 1,2-dimethoxyethane and 38 parts of dimethylaniline. The resulting mixture was heated for an additional period of 180 minutes at a temperature of 70° C., whereupon the temperature was reduced to 25° C. and the contents of the reaction vessel were discharged to a steam still. Upon recovery by steam-distillation of the tetraethyllead produced, the yield of tetraethyllead was determined to be 34.2 parts, corresponding to a yield of 63.5 per cent based upon the amount of sodium charged during the reaction as both sodium-lead alloy and sodium naphthalene complex as determined according to Equation III, or 24.4 per cent based on the amount of lead originally charged to the reaction.

Example II

In a reaction vessel similar to that employed in the preceding example were added 100 parts of free lead produced in a previous reaction between ethyl chloride and sodium-lead alloy according to the process represented by Equation I, 156 parts of ethyl chloride, and 233 parts of a solution comprising 53.2 parts of sodium-naphthalene complex, 122.9 parts of 1,2-dimethoxyethane and 56.7 parts of dimethylaniline. This mixture was heated to a temperature of 70° C. with agitation for a period of 180 minutes. At the end of this time the contents of the reaction vessel were cooled to 25° C. and discharged to a steam still and the product tetraethyllead was recovered as in the foregoing example. The yield of product from this operation was 6.6 parts, or 22.4 per cent based upon the sodium charged as sodium naphthalene complex in accordance with Equation II.

Example III

To 100 parts of free lead obtained in accordance with the procedure of Example II, in a similar reaction vessel, was added 550 parts of ethyl iodide, 221 parts of a solution of 67 parts of sodium-naphthalene complex in 154 parts of 1,2-dimethoxyethane. By a series of operations similar to the above example, 24 parts of tetraethyllead was produced corresponding to a yield of 61 per cent based upon the sodium charged in accordance with Equation II, or 15.4 per cent based on the lead charged.

Example IV

In an operation similar to Example III but wherein 107 parts of dimethylaniline was added along with 156 parts of sodium-naphthalene complex and 521 parts of 1,2-dimethoxyethane, 60 parts of tetraethyllead were obtained, a yield of 38.4 per cent based on the lead charged in accordance with Equation II or 72 per cent based on the sodium charged.

Example V

In an operation similar to that described in Example III above, with the exception that the 1,2-dimethoxyethane solution of sodium-naphthalene complex was replaced by a solution of 84.8 parts of lithium-naphthalene complex, in 189 parts of 1,2-dimethoxyethane, a yield of tetraethyllead corresponding to 24.6 per cent was obtained, based on the lithium charged in accordance with Equation II.

Example VI

In an operation similar to Example II above wherein the ethyl chloride was replaced by 308 parts of methyl chloride, a yield of tetraethyllead of 8.4 per cent was obtained, based on the sodium in accordance with Equation II.

Example VII

In an operation similar to Example IV, wherein the sodium-naphthalene complex was replaced by 86 parts of a sodium-biphenyl complex, the yield of tetraethyllead was 11.1 per cent based on the sodium charged in accordance with Equation II.

Example VIII

In the reaction vessel of Example I was charged 100 parts of lead resulting from the alkylation of sodium-lead alloy with ethyl chloride, 550 parts of ethyl iodide, 145 parts of 1,2-dimethoxyethane, 16 parts of dimethylaniline, and 150 parts of a dispersion previously prepared by vigorously agitating a mixture of 23 parts of molten sodium in 127 parts of naphthalene at a temperature of 105° C. This charge was heated to a temperature of 80° C. for a period of 3 hours, whereupon it was discharged to a steam still and the tetraethyllead recovered by steam distillation. The yield of tetraethyllead in this operation was 19.7 per cent based upon the sodium dispersion charged to the reaction vessel in accordance with Equation II.

We claim:

1. A process for making tetra-substituted organolead compounds comprising reacting lead with an agent selected from the class consisting of alkylating and arylating agents in the presence of an alkali metal-polycylic aromatic hydrocarbon complex, said agent having the hydrocarbon radicals in question and having a negative radical which reacts with the alkali metal in said alkali metal complex.

2. A process for making tetraalkyllead comprising reacting lead with an alkyl halide in the presence of a sodium-polycyclic aromatic hydrocarbon complex.

3. A process for making tetraethyllead comprising reacting lead with ethyl chloride in the presence of sodium-naphthalene.

HYMIN SHAPIRO.
EARL G. DE WITT.

REFERENCES CITED

The following references are of record in the file of this patent:

Chemical Abstracts, vol. 36, p. 1595[2] (1942).